United States Patent
Camp, Jr. et al.

(10) Patent No.: US 7,321,776 B2
(45) Date of Patent: Jan. 22, 2008

(54) ESTIMATING GPS TIME AT CELLULAR TERMINALS BASED ON TIMING OF INFORMATION FROM BASE STATIONS AND SATELLITES

(75) Inventors: William O. Camp, Jr., Chapel Hill, NC (US); Gerald Michalak, Cary, NC (US); L. Scott Bloebaum, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 814 days.

(21) Appl. No.: 10/672,547

(22) Filed: Sep. 25, 2003

(65) Prior Publication Data

US 2005/0070223 A1 Mar. 31, 2005

(51) Int. Cl.
*H04Q 7/20* (2006.01)
(52) U.S. Cl. ............... 455/456.1; 455/12.1; 455/13.2; 455/3.02; 455/502; 455/503; 342/358; 342/357.1; 701/213; 701/214
(58) Field of Classification Search ............ 455/13.2, 455/12.1, 502, 503, 456.1, 3.02; 342/357.1–357.17; 701/213, 214
See application file for complete search history.

(56) References Cited

U.S. PATENT DOCUMENTS 4,445,118 A 4/1984 Taylor et al. ............... 343/357

(Continued)

FOREIGN PATENT DOCUMENTS

DE 4424412 1/1996

(Continued)

OTHER PUBLICATIONS

Notification of Transmittal of the International Search Report and the Written Opinion of the International Searching Authority, or the Declaration, PCS/US2004,016457, NOv. 29, 2004.

*Primary Examiner*—Nay Maung
*Assistant Examiner*—Fayyaz Alam
(74) *Attorney, Agent, or Firm*—Myers Bigel Sibley & Sajovec, P.A.

(57) ABSTRACT

A mobile terminal generates an estimate of GPS time. The mobile terminal includes a cellular receiver, a GPS receiver, and a processor. The cellular receiver is configured to receive communication signals from cells in a wireless communication system. The GPS receiver receives GPS signals and determines a GPS time reference therefrom. The processor estimates a cell time reference from the received communication signals, and generates cell-to-GPS timing data that represents a time offset between the cell time reference and the GPS time reference. The processor then estimates GPS time based on a time indicator portion of a received communication signal and the cell-to-GPS timing data. The estimated GPS time may be used by the GPS receiver to acquire GPS signals.

18 Claims, 3 Drawing Sheets

U.S. PATENT DOCUMENTS

| | | | |
|---|---|---|---|
| 4,457,006 A | 6/1984 | Maine | 375/87 |
| 4,601,005 A | 7/1986 | Kilvington | 364/602 |
| 4,701,934 A | 10/1987 | Jasper | 375/1 |
| 4,785,463 A | 11/1988 | Janc et al. | 375/1 |
| 4,797,677 A | 1/1989 | MacDoran et al. | 342/352 |
| 4,959,656 A | 9/1990 | Kumar | 342/418 |
| 4,998,111 A | 3/1991 | Ma et al. | 342/352 |
| 5,043,736 A | 8/1991 | Darnell et al. | 342/357 |
| 5,119,102 A | 6/1992 | Barnard | 342/357 |
| 5,153,598 A | 10/1992 | Alves, Jr. | 342/352 |
| 5,202,829 A | 4/1993 | Geier | 364/449 |
| 5,223,844 A | 6/1993 | Mansell et al. | 342/357 |
| 5,225,842 A | 7/1993 | Brown et al. | 342/357 |
| 5,245,634 A | 9/1993 | Averbuch | 375/108 |
| 5,271,034 A | 12/1993 | Abaunza | 375/1 |
| 5,311,194 A | 5/1994 | Brown | 342/357 |
| 5,317,323 A | 5/1994 | Kennedy et al. | 342/357 |
| 5,323,163 A | 6/1994 | Maki | 342/357 |
| 5,323,322 A | 6/1994 | Mueller et al. | 364/449 |
| 5,365,450 A | 11/1994 | Schuchman et al. | 364/449 |
| 5,379,047 A | 1/1995 | Yokev et al. | 342/457 |
| 5,379,224 A | 1/1995 | Brown et al. | 364/449 |
| 5,379,320 A | 1/1995 | Fernandes et al. | 375/1 |
| 5,416,797 A | 5/1995 | Gilhousen et al. | 375/705 |
| 5,418,538 A | 5/1995 | Lau | 342/357 |
| 5,420,592 A | 5/1995 | Johnson | 342/357 |
| 5,430,759 A | 7/1995 | Yokev et al. | 375/202 |
| 5,448,773 A | 9/1995 | McBurney et al. | 455/343 |
| 5,483,549 A | 1/1996 | Weinberg et al. | 375/200 |
| 5,491,486 A | 2/1996 | Welles et al. | 342/357 |
| 5,663,734 A | 9/1997 | Krasner | 342/357 |
| 5,663,735 A | 9/1997 | Eshenbach | 342/357 |
| 5,812,087 A * | 9/1998 | Krasner | 342/357.1 |
| 5,945,944 A * | 8/1999 | Krasner | 342/357.06 |
| 6,070,078 A | 5/2000 | Camp, Jr. et al. | |
| 6,075,987 A | 6/2000 | Camp, Jr. et al. | 455/427 |
| 6,084,544 A | 7/2000 | Camp, Jr. | 342/357.15 |
| 6,188,351 B1 | 2/2001 | Bloebaum | 342/357.15 |
| 6,204,808 B1 | 3/2001 | Bloebaum et al. | 342/357.07 |
| 6,252,543 B1 | 6/2001 | Camp | 342/357.06 |
| 6,266,533 B1 | 7/2001 | Zadeh et al. | |
| 6,295,023 B1 | 9/2001 | Bloebaum | 342/357.06 |
| 6,323,803 B1 | 11/2001 | Jolley et al. | 342/357.03 |
| 6,415,154 B1 * | 7/2002 | Wang et al. | 455/456.1 |
| 6,433,735 B1 | 8/2002 | Bloebaum et al. | 342/357.1 |
| 6,433,739 B1 | 8/2002 | Soliman | |
| 6,535,815 B2 | 3/2003 | Bloebaum | 701/213 |
| 6,603,978 B1 * | 8/2003 | Carlsson et al. | 455/502 |
| 6,628,628 B1 * | 9/2003 | Yamazaki | 370/320 |
| 7,043,265 B2 * | 5/2006 | Nir et al. | 455/502 |
| 2001/0039192 A1 * | 11/2001 | Osterling et al. | 455/502 |
| 2002/0173322 A1 * | 11/2002 | Turetzky et al. | 455/502 |

FOREIGN PATENT DOCUMENTS

| | | |
|---|---|---|
| EP | 0 444 738 | 9/1991 |
| EP | 0 447 978 | 9/1991 |
| GB | 2 273 218 | 6/1994 |
| GB | 2 308 033 | 6/1997 |
| WO | 94/28434 | 12/1994 |
| WO | 96/15636 | 5/1996 |
| WO | 97/14049 | 4/1997 |
| WO | WO 02/075349 A2 | 9/2002 |

* cited by examiner

| Cell-to-GPS Timing Repository |||
|---|---|---|
| Cell Identifier | Cell-to-GPS Timing Data | Timing Drift Rate |
| Cell 1 | Timing Offset 1 | Drift Data 1 |
| Cell 2 | Timing Offset 2 | Drift Data 2 |
| Cell 3 | Timing Offset 3 | Drift Data 3 |
| Cell X | Timing Offset 4 | Drift Data 4 |

Figure 5

ESTIMATING GPS TIME AT CELLULAR TERMINALS BASED ON TIMING OF INFORMATION FROM BASE STATIONS AND SATELLITES

FIELD OF THE INVENTION

This invention relates to the field of global positioning, and more particularly to mobile terminals and methods that derive an estimate of GPS time.

BACKGROUND OF THE INVENTION

Satellite positioning receivers determine their position by computing relative times of arrival of signals transmitted simultaneously from satellites such as the U.S. Global Positioning System (GPS) or NAVSTAR satellites. For example, the GPS Orbital Constellation has 28 satellites which orbit the earth in 12 hour orbits. The satellites are arranged in six orbital planes each containing four or more satellites. The orbital planes are spaced 60° apart from each other and are inclined approximately 55° with respect to the equatorial plane. This constellation provides a satellite positioning receiver with approximately four to twelve satellites visible from any point on earth. These satellites transmit, as part of their message, both satellite positioning data, so-called "ephemeris" data, as well as clock timing data. In addition, the satellites transmit time-of-week (TOW) information associated with the satellite signal, which allows the receiver to unambiguously determine time. The process of searching for and acquiring GPS signals, reading the ephemeris and other data for a multiplicity of satellites, and then computing the location of the receiver (and accurate time-of day) from this data is time consuming, sometimes requiring several minutes. In some applications, this lengthy processing time introduces unacceptable delays, and furthermore, reduces battery life in portable applications.

In addition, in many situations there may be blockage of the satellite signals. In these cases, the received signal level from the GPS satellites can be too low to demodulate and derive the satellite data signals without error. Such situations may arise in personal tracking and other highly mobile applications. In these situations, it may be difficult for a GPS receiver to acquire and track the GPS signals.

SUMMARY OF THE INVENTION

Some embodiments of the present invention provide a mobile terminal that generates an estimate of GPS time. The mobile terminal includes a cellular receiver, a GPS receiver, and a processor. The cellular receiver is configured to receive communication signals from cells in a wireless communication system. The GPS receiver receives GPS signals and determines a GPS time reference therefrom. The processor estimates a cell time reference from communication signals from a cell, and generates cell-to-GPS timing data that represents a time offset between the cell time reference and the GPS time reference. The processor then subsequently estimates GPS time based on a subsequently received time indicator portion of a communication signal from the cell and the cell-to-GPS timing data. Accordingly, the mobile terminal itself may generate the cell-to-GPS timing data and the GPS time estimate. The mobile terminal may estimate GPS time using signals that are transmitted by a cell for communication purposes and not for the purpose of estimating GPS time or otherwise for the purpose of acquiring GPS signals.

The GPS time estimate may be used by the GPS receiver to acquire GPS signals, and may decrease the time needed to acquire a first fix on location (time-to-first-fix) based on the GPS signals and/or may improve the sensitivity of the GPS receiver.

The cell time reference may be developed in a mobile terminal by, for example, multiplying an elapsed number of frames by an expected time period of the frames. However, due to inaccuracy of a base station clock, frame periods can vary and cause error in the cell time reference. The mobile terminal may estimate an error rate for the cell time reference. The error rate can be the deviation of frame periods, or other communicated time indication, for a base station from an expected period. The estimated error rate may be used to reduce error in the estimation of the cell time. Accuracy of the estimated GPS time may be improved by using the error rate for the cell time reference along with the time indicator portion of a received communication signal and the cell-to-GPS timing data to estimate GPS time.

In some other embodiments of the present invention, a mobile terminal includes a cellular receiver, a GPS receiver, a memory, and a processor. The receiver is configured to receive communication signals from cells in a wireless communication system. The GPS receiver is configured to receive GPS signals. The memory contains a repository of cell-to-GPS timing data that is representative of timing offset between GPS time and cell time for two or more cells. The processor is configured to identify an originating cell of a received communication signal, and is configured to estimate GPS time using the repository of cell-to-GPS timing data, the identity of the originating cell, and a time indicator portion of the received communication signal. Accordingly, when the mobile terminal receives a communication signal from a cell, it may identify the cell and look-up the associated cell-to-GPS timing data in the repository.

The repository of cell-to-GPS timing data may represent a timing offset between GPS time and a time indicator portion of a communication signal from a first cell, and may represent a timing offset between a different GPS time and a time indicator portion of a communication signal from a second cell. The memory may be a non-volatile memory that retains the repository of cell-to-GPS timing data after power has been removed from the mobile terminal.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and mobile terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to communicate via a wireless interface such as, for example, a cellular interface, a wireless local area network interface (WLAN), Bluetooth interface, another RF communication interface, and/or an optical interface. Example mobile terminals include, but are not limited to, a cellular mobile terminal; a personal communication terminal that may combine a cellular mobile terminal with data processing, facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver. The mobile terminal may be configured to communicate via a cellular communication link that may include a protocol such as, for example, ANSI-136, Global Standard for Mobile (GSM) communication, General Packet Radio Service (GPRS), enhanced data rates for GSM evolution (EDGE), code division multiple access (CDMA), wideband-CDMA, CDMA2000, and UMTS. Communication protocols as used herein may specify the information communicated, the timing, the frequency, the modulation, and/or the operations for setting-up and/or maintaining a communication connection.

Figure 1:
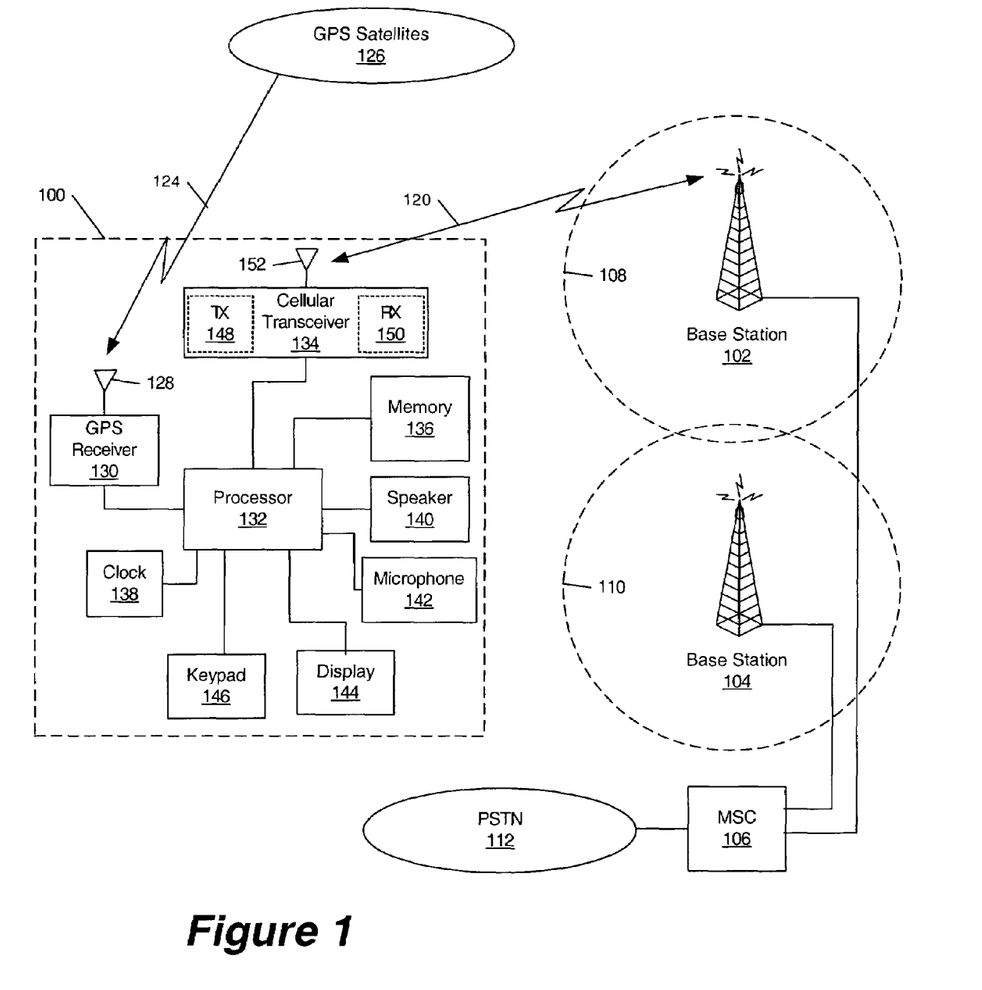
FIG. 1 illustrates a wireless communication system according to various embodiments of the present invention.

FIG. 1 is a functional block diagram of an exemplary wireless communication system that includes a plurality of base stations 102 and 104 that are connected to one or more mobile services switching centers (MSC) 106. Each of the base stations 102 and 104 are located in, and provide services to, a geographic region referred to as a cell, 108 and 110, respectively. In general, there is one base station for each cell. Within each cell, there may be a plurality of mobile terminals 100 that communicate via radio link with a base station in a manner well known in the art. The base stations 102 and 104 allow a user of the mobile terminal 100 to communicate with other mobile terminals 100, or with users connected to a Public Switched Telephone Network (PSTN) 112. The MSC 106 routes calls to and from the mobile terminal 100 through one of the base stations 102 and 104 that, for example, provides the strongest communication link to the mobile terminal 100. Information concerning the cell location and activity status of the mobile terminal 100 is stored in a Home Location Register (not shown) and a Visitor Location Register (not shown), which may be incorporated into, or otherwise communicate with, the MSC 106. Although only two cells 108 and 110 are shown for illustration purposes, a typical cellular communications system may include hundreds of cells and may service thousands of mobile terminals 100.

The mobile terminal 100 communicates with the base stations 102 and 104 according to one or more communication protocols over a wireless communication channel. For example, as shown in FIG. 1, the mobile terminal 100 communications over communication channel 120 with base station 102. The mobile terminal 100 is also configured to determine its geographic position from GPS signals 124 that are received from a plurality of orbiting GPS satellites 126.

The mobile terminal 100 includes a GPS receiver 130, a processor 132, a transceiver 134, a memory 136, a clock 138, and may also include a speaker 140, a microphone 142, a display 144, and a keypad 146. The GPS receiver 130 receives the GPS signals via an antenna 128.

The memory 136 may include one or more erasable programmable read-only memories (EPROM or Flash EPROM), battery backed random access memory (RAM), magnetic, optical, or other digital storage device, and may be separate from, or at least partially within, the processor 132. The clock 138 may be, for example, a counter, and may be separate from, or at least partially within, the processor 132. The processor 132 may include more than one processor, such as, for example, a general purpose processor and a digital signal processor, which may be enclosed in a common package or separate and apart from one another. The transceiver 134 typically includes both a transmitter 148 and a receiver 150 to allow two way communications, but the present invention is not limited to such devices and, as used herein, a "transceiver" may include only the receiver 150. The mobile terminal 100 may communicate with the base stations 102 and 104 using radio frequency signals, which may be communicated through an antenna 152 over the communication channel 120 according to one or more cellular communication protocols.

The GPS receiver 130 is configured to determine its geographic position from the GPS signals 124 received from a plurality of the GPS satellites 126. In determining its geographic position, the GPS receiver 130 monitors a GPS time of the GPS satellites 126 based on the received GPS signals. While the GPS receiver 130 is shown as a separate component in FIG. 1, is should be understood that the processor 132 and/or transceiver 134 may be configured to provide at least a portion of the functionality of the GPS receiver 130, in addition to their other functions, and/or may share at least some common component packaging.

While embodiments of the present invention are described below with reference to GPS satellites 126, it will be appreciated that the teachings are equally applicable to positioning systems which utilize pseudolites or a combination of satellites 126 and pseudolites. Pseudolites are ground based transmitters which broadcast a signal similar to a traditional satellite-sourced GPS signal modulated on an L-band carrier signal, generally synchronized with GPS time. Pseudolites are useful in situations where GPS signals from orbiting GPS satellites 126 might not be available, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites. Also, while the following discussion is with reference to application upon the United States Global Positioning Satellite (GPS) system, these methods are equally applicable to similar satellite positioning systems, such as the Russian Glonass system. The term "GPS" used herein includes such alternative satellite positioning systems, including the Russian Glonass system. Thus, the term "GPS signals" includes signals from such alternative satellite positioning systems.

As described in U.S. Pat. No. 5,945,944 and U.S. Pat. No. 6,603,978, the disclosures of which are incorporated herein by reference in their entirety, the time required for a GPS receiver to acquire a first fix on location (time-to-first-fix) and signal sensitivity may both be improved if the GPS receiver is provided with an accurate estimate of the current GPS time.

According to some embodiments of the present invention, the mobile terminal 100 estimates the current time of the GPS system based on a timing relationship between a time indicator portion of a communication signal from a base station and the GPS time. The mobile terminal 100 estimates a cell time reference for a communication channel in a cell. A GPS time reference is determined from the GPS signals 124. The mobile terminal 100 then determines cell-to-GPS timing data that is representative of a timing offset between the cell time reference and the GPS time reference. Thereafter, the mobile terminal 100 can estimate GPS time using a time indicator portion of a communication signal in the cell and using the cell-to-GPS timing data. For example, once a timing offset between a cell time reference and GPS time reference is known, the offset may be added to a time indication portion of a communication signal to estimate the GPS time.

Figure 2:
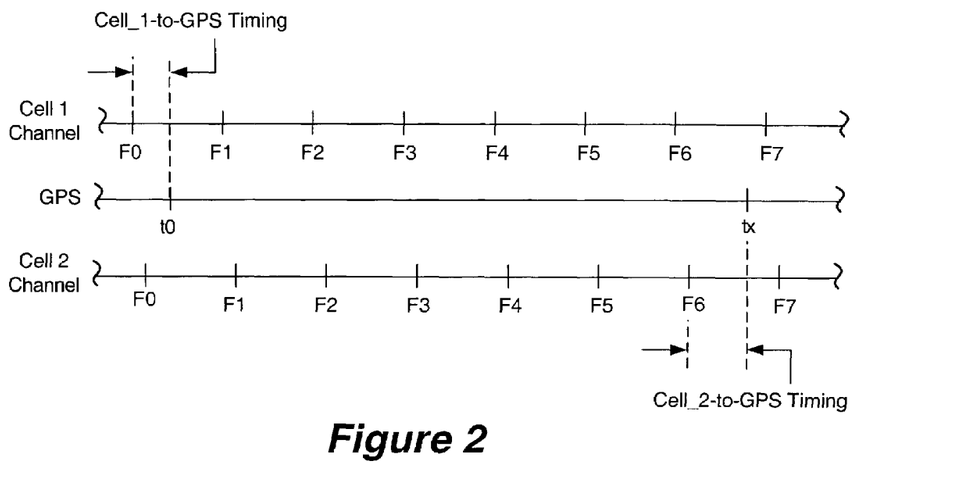
FIG. 2 illustrates example timing offsets between frame events in communication channels of two cells and time indicator portions of a GPS signal.

FIG. 2 illustrates example timing offsets between time indicators in a GPS signal and time indicators in two cellular communication channels. For purposes of illustration only, the first and second cellular communication channels ("Cell 1 Channel" and "Cell 2 Channel") are shown with periodic frame boundaries F0-F7. A time reference for each of these communication channels is determined from the timing of their respective frame boundaries F0-F7. The communication channels may be, for example, control channels and/or traffic channels that have frame boundaries that are formatted according to, for example, the GSM or ANSI-136 protocols. The first communication channel is from a different cell than the second communication channel. Consequently, as shown in FIG. 2, the frame boundaries of the first and second communication channels have the same periodicity, however, they are not aligned. Although not shown in FIG. 2, the first and the second communication channel may have different frame periodicity (i.e., a GSM channel versus an ANSI-136 channel) and/or have different time indications (i.e., GSM frame boundaries versus CDMA timing events). A real time clock in the mobile terminal 100 may be used to resolve ambiguity that may arise when the elapsed time is longer than a multi-frame period. The cell time reference may alternatively, or additionally, be based on other received time indicators, such as one or more symbols in a training sequence.

The mobile terminal 100 may use the clock 138 to establish a time reference for the two cells using the time indicators in the communication channels (Cell 1 Channel and Cell 2 Channel). For example, when the mobile terminal 100 is operating in the first cell 108, the clock 138 may be synchronized to the frame boundaries F0-F7 in the Cell 1 Channel to generate a time reference for the first cell ("first cell time reference"). The mobile terminal 100 also generates a time reference for the GPS satellites 126 ("GPS time reference") by measuring time indicators in the GPS signal. The mobile terminal 100 may then determine a timing offset between the first cell time reference and the GPS time reference to form cell-to-GPS timing data for the first cell 108. The mobile terminal 100 may then subsequently use the timing indicators in the Cell 1 Channel and the cell-to-GPS timing data to estimate GPS time. The estimated GPS time may be used by the GPS receiver 130 to reduce the time needed to acquire a first fix on location (time-to-first-fix) and/or to improve signal sensitivity.

In an ANSI-136 cell, the cell time reference may be expressed in terms of Extended Hyperframe Counter (EHC), Hyperframe Counter (HC), Primary/Secondary Superframe (PSS), Superframe Phase (SP), Timeslot Number (TN), and Symbol Number (SN). In a GSM cell, the cell time may be expressed in terms multiframe number, frame number, slot number, symbol number, real time clock reading, error rate, and/or identity of a basestation. Cell time may also be determined based on, for example, frequency, channel number, and/or base station identity code. The mobile terminal 100 can thereby establish a cell time reference based on the received frame structure of the cell, and can correlate that cell time reference with GPS time to generate cell-to-GPS timing data. Then at later time, the mobile terminal 100 can use a received frame structure and the cell-to-GPS timing data to estimate GPS time. The cell time reference may alternatively, or additionally, be based on a time reference that is received from, for example, a CDMA base station.

As the mobile terminal 100 moves within the first cell 108, the distance between the mobile terminal 100 and the base station 102, which services that cell, varies, and the associated arrival time of the Cell 1 Channel timing indicators varies. Accordingly, the timing offset between the first cell time reference and the GPS time reference varies as the mobile terminal 100 moves. Consequently, movement of the mobile terminal 100 may introduce error into the cell-to-GPS timing data. Because the base station 102 is stationary, this error may be reduced or avoided by the mobile station 100 generating and using cell-to-GPS timing data for the base station 102. The mobile terminal 100 may generate a time reference for the base station 102 that services the first cell 108 by compensating the first cell time reference for the distance between the mobile terminal 100 and that base station 102.

In some embodiments of the present invention, the base station 102 adjusts the timing of transmissions from mobile terminals in the first cell 108 based on the relative distances between the mobile terminals and the base station 102, and so that the mobile station signals are received within their assigned frames. The base station 102 estimates distance between itself and the mobile terminal 100, and transmits timing advance information to the mobile terminal 100 when, for example, the mobile terminal 100 requests communication access. The mobile terminal 100 may use the timing advance information to adjust timing of its transmissions. The mobile terminal 100 may also estimate a time reference for the base station 102 using the timing indicators in the Cell 1 Channel and using the timing advance information. The mobile terminal 100 then determines a timing offset between the time reference for the base station 102 and the GPS time reference to form cell-to-GPS timing data for the first cell 108. The mobile terminal 100 may then later use the timing indicators in the Cell 1 Channel, timing advance information from the first cell 108, and the cell-to-GPS timing data to estimate GPS time.

In some cellular protocols, such as GSM, timing advance information is transmitted to a mobile terminal as part of a call-setup and during a local update. The mobile terminal 100 may estimate GPS time responsive to receiving timing advance information, and/or may cause a base station to send timing advance information responsive to a need to generate a GPS time estimate.

Because each cell may have a different time reference, the mobile terminal 100 may generate a repository of cell-to-GPS timing data as it receives channel timing information from different cells. When an estimate of GPS time is needed, the mobile terminal 100 may identify a cell from which it is receiving timing indicators, and look-up available cell-to-GPS timing data for the identified cell. The mobile terminal may thereby avoid generating cell-to-GPS timing data each time it estimates GPS time, by using cell-to-GPS timing data that was previously generated for a cell. The timing indicators and the cell-to-GPS timing data for the identified cell may then be used to estimate GPS time. In a GSM system, the identity of a cell or cell may be determined from a location area code and/or a routing area identifier. In an ANSI-136 system, the identity of a cell may be determined from a digital verification color code and/or a virtual mobile location area code.

Figure 3:
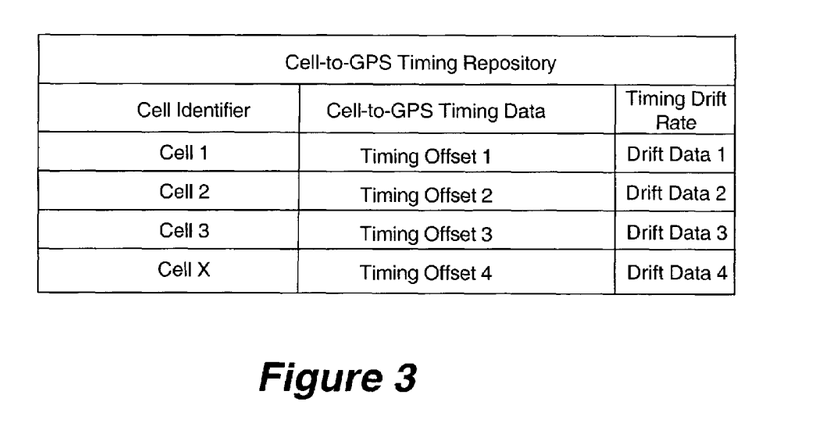
FIG. 3 illustrates a data structure that may be used as a cell-to-GPS timing data repository according to various embodiments of the present invention.

As shown in FIG. 3, the repository of cell-to-GPS timing data may contain a data structure that includes a cell identifier field and a cell-to-GPS timing data field. When cell-to-GPS timing data has been generated for cell, that information along with the identity of the associated cell can be stored in associated fields of the repository. Cell-to-GPS timing data may be generated for a cell for which such data has not previously been generated, or it may replace older data for a cell that is already in the repository. The repository of cell-to-GPS timing data may be stored in non-volatile memory, such as memory 136, so that it may be available after the mobile terminal 100 has been powered off. The mobile terminal 100 may transmit individual cell-to-GPS timing data, or the repository of cell-to-GPS timing data, to one or more of the base stations 102 and 104. The transmitted cell-to-GPS timing data may be used be used by the MSC 106 and/or another component of the system to estimate GPS time.

Over time, base station time drifts due to, for example, base station clock error, which causes an associated drift in the channel timing information. For example, if a base station has a clock error of 0.01 ppm, in three hours the base station may accumulate about 100 microseconds of error in the timing of its channel timing information. Consequently, the estimated GPS time can become less accurate as more time passes between when cell-to-GPS timing data was obtained for a cell and when it is subsequently used with current channel timing information to estimate the GPS time. The mobile terminal 100 may estimate base station time drift by generating successive time references for a base station over time, and noting the corresponding GPS time when the time reference is generated. Variation between successive pairs of time reference and corresponding GPS time can be used to estimate the base station time drift. The estimated time drift may then be extrapolated forward in time to improve the determination of cell time for a cell, and thereby compensate the cell-to-GPS timing data for the time drift of a base station. As a result, GPS time may be estimated with reduced error as more time passes between when cell-to-GPS timing data is generated for a cell and when the GPS time estimate is subsequently made. The mobile terminal 100 may thereby estimate GPS time using the cell-to-GPS timing data for a longer period of time.

Information regarding the time drift of a base station may be added to the cell-to-GPS timing repository. For example, time drift rate data may be associated with cell identifiers, as shown in FIG. 3. The time drift rate data may include a time stamp as to when cell-to-GPS timing data was developed for a cell, and a value that represents how much time the base station time drifts over a predetermined period. The mobile terminal 100 may then generate updated cell-to-GPS timing data for a cell by looking-up available cell-to-GPS timing data using the cell identifier, and compensating the cell-to-GPS timing data using the elapsed time since the data developed and the time drift rate for the cell.

The mobile terminal 100 may transmit the time drift rate data for a cell to the base station that services the cell, so that the base station may improve the accuracy of its time reference. The base station may combine time drift information from a plurality of mobile terminals 100 to further improve the accuracy of its time reference.

Figure 4:
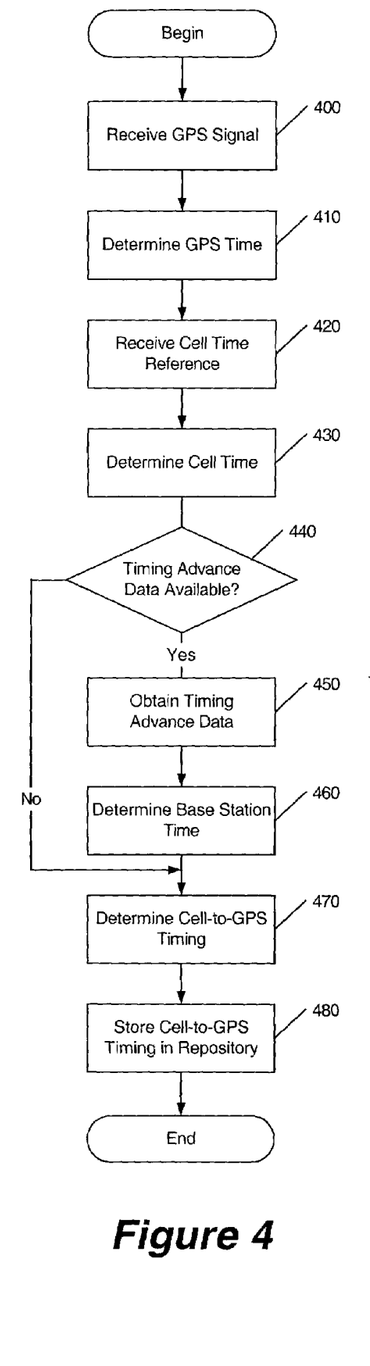
FIG. 4 illustrates a flowchart of operations for generating a repository of cell-to-GPS timing data that is representative of timing offset between GPS time and cell time for a plurality of cells according to various embodiments of the present invention.

FIG. 4 illustrates a flowchart of operations that may be used to generate a repository of cell-to-GPS timing data for a plurality of cells. At Block 400, a GPS signal is received. The GPS signal includes signals from a plurality of the GPS satellites 126. At Block 410, GPS time is determined from the GPS signal. At Block 420, a cell time reference is received, and, at Block 430, cell time is determined from the cell time reference. The cell time reference may include time indications relating to frame structure of a communication channel, and/or may be a time value relative to a known time reference. The cell time reference may additionally, or alternatively, be based on information that is received over a traffic or data channel. For example, timing indications may be received over a data network from an Internet site. When using timing indications over a data network, network delays may be estimated to improve the accuracy of the resulting cell time reference.

At Block 440, a determination is made as to whether timing advance data is available for a base station. If it is available, then at Block 450 timing advance data is obtained by, for example, requesting call setup from a base station. The timing advance data is used at Block 460 to translate the cell time to base station time. The timing advance data indicates the distance between the mobile terminal and the base station. Propagation time of the cell time reference from the base station to the mobile station can be determined from the distance, and the cell time can be translated to base station time based on the propagation time.

At Block 470, cell-to-GPS timing data is determined based on timing offset between the base station time and the GPS time. At Block 480, the cell-to-GPS timing data and an identity of the associated cell are retained in the repository. The operations of Blocks 400 through 480 may be repeated for each cell for which cell-to-GPS timing data has not been recorded in the repository and/or to update data that has become unacceptably old due to, for example, time drift of a base station clock.

Figure 5:
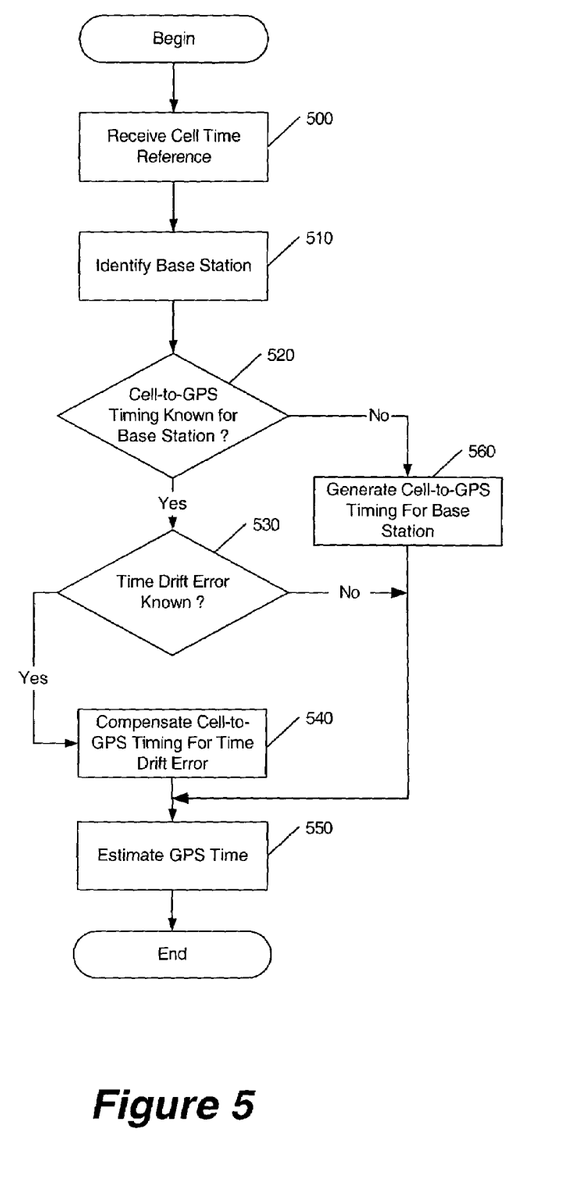
FIG. 5 illustrates a flowchart of operations for estimating GPS time according to various embodiments of the present invention.

FIG. 5 illustrates a flowchart of operations that may be used to estimate GPS time. At Block 500, a cell time reference is received from a cell via a communication channel. The cell is identified at Block 510, and a determination is made at Block 520 whether cell-to-GPS timing data is known in the repository for the identified cell. If known, then at Block 530 a determination is made whether time drift rate data is know for the identified cell. If the time drift rate data is known, then at Block 540 the cell-to-GPS timing data that is retrieved from the repository and compensated to reduce error due to time drift. The cell-to-GPS timing data may be compensated by, for example, multiplying the elapsed time since the cell-to-GPS timing data was generated by the rate of time drift rate, and adding the result to the time offset that is represented by the cell-to-GPS timing data. When the cell-to-GPS timing data is not know for the identified cell, at Block 520, the data is generated at Block 560 by, for example, the operations shown in FIG. 4.

At Block 550, GPS time is estimated using the cell-to-GPS timing data and a time indication that is received from the base station via a communication channel.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for estimating GPS time in a mobile terminal that operates in a wireless communication system, the method comprising:
   generating at the mobile terminal a repository of cell-to-GPS timing data that is representative of a timing offset between GPS time and cell time for two or more cells with which the mobile terminal communicates;
   identifying an originating cell of a received communication signal from a base station;
   identifying timing advance data in the received communication signal, the timing advance data indicating distance between the mobile terminal and the base station;
   estimating GPS time using the repository of cell-to-GPS timing data, the identity of the originating cell, the timing advance data, and a time indicator portion of the received communication signal.

2. The method of claim 1, wherein generating at the mobile terminal a repository of cell-to-GPS timing data comprises:
   determining a first timing offset between a time indicator portion of a first communication signal from a first cell and a time indicator portion of a GPS communication signal;
   determining a second timing offset between a time indicator portion of a second communication signal from a second cell and a time indicator portion of a GPS communication signal; and
   maintaining the first and second timing offsets and identifiers for the associated first and second cells in the repository of cell-to-GPS timing data.

3. The method of claim 2, wherein:
   identifying an originating cell of a received communication signal comprises identifying an originating cell of a third communication signal; and
   estimating GPS time comprises using the repository of cell-to-GPS timing data, the identity of the originating cell, and a time indicator portion of the third communication signal to estimate GPS time.

4. The method of claim 2, wherein generating at the mobile terminal a repository of cell-to-GPS timing data comprises:
   determining a time difference between receiving a predetermined portion of a frame structure of the first communication signal from the first one of the cells and receiving a time indicator portion of a GPS communication signal; and
   determining a time difference between receiving a predetermined portion of a frame structure of the second communication signal from the second one of the cells and receiving a time indicator portion of a GPS communication signal.

5. The method of claim 1, further comprising acquiring GPS signals using the estimated GPS time.

6. The method of claim 1, wherein generating at the mobile terminal a repository of cell-to-GPS -timing data comprises retaining cell-to-GPS timing data for a plurality of the cells in a non-volatile memory in the mobile terminal.

7. The method of claim 1, further comprising transmitting at least a portion of the repository of cell-to-GPS timing data from the mobile terminal to a base station.

8. A method for estimating GPS time in a mobile terminal that operates in a wireless communication system, the method comprising:
   operating the mobile terminal on a communication channel in a cell in the wireless communication system, the communication channel having a cell time reference;
   receiving timing advance data from a base station via the communication channel, the timing advance data indicating distance between the mobile terminal and the base station;
   receiving a GPS communication signal at the mobile terminal, the GPS communication signal having a GPS time reference;
   determining in the mobile terminal cell-to-GPS timing data that is representative of a timing offset between the cell time reference and the GPS time reference; and
   estimating in the mobile terminal a GPS time based on a time indicator portion of the communication channel, the timing advance data, and the cell-to-GPS timing data.

9. The method of claim 8, further comprising:
   estimating a timing error rate for the cell time reference of the communication channel; and
   estimating in the mobile terminal the GPS time based on the time indicator portion of the communication channel, the estimated timing error rate for the cell time reference, and the cell-to-GPS timing data.

10. The method of claim 9, wherein estimating a timing error rate for the cell time reference of the communication channel comprises:
    measuring a cell time reference;
    measuring a GPS time that corresponds close in time to the measured cell time reference;
    repeating at least one more time the measuring of the cell time reference and the measuring of the corresponding GPS time; and
    estimating the timing error rate for the cell time reference based on variation between corresponding pairs of cell time references and GPS times.

11. A method for estimating GPS time in a mobile terminal that operates in a wireless communication system, the method comprising:
    operating the mobile terminal on a communication channel in a cell in the wireless communication system, the communication channel having a time reference;

receiving timing advance data on the communication channel, wherein the timing advance data is indicative of distance between the mobile terminal and a base station that is servicing the communication channel;

determining a time reference for the base station based on the timing advance data and the time reference of the communication channel;

receiving a GPS communication signal at the mobile terminal, the GPS communication signal having a GPS time reference;

generating cell-to-GPS timing data at the mobile terminal that is representative of a timing offset between the time reference for the base station and the GPS time reference; and estimating GPS time based on the cell-to-GPS timing data and a time indicator portion of a communication signal from the base station.

12. The method of claim 11, wherein the communication channel comprises a control channel and a traffic channel, and wherein receiving timing advance data on the communication channel comprises receiving the timing advance data on the traffic channel, and wherein determining a time reference for the base station comprises determining a time reference for the control channel and compensating the control channel time reference based on the timing advance data.

13. A mobile terminal comprising:
a receiver that is configured to receive communication signals from cells in a wireless communication system;
a GPS receiver that is configured to receive GPS signals;
a memory containing a repository of cell-to-GPS timing data that is representative of timing offset between GPS time and cell time for two or more cells; and
a processor that is configured to identify an originating cell of a received communication signal from a base station, and is configured to estimate GPS time using the repository of cell-to-GPS timing data, the identity of the originating cell, and a time indicator portion of the received communication signal, and timing advance data that indicates distance between the mobile terminal and the base station.

14. The mobile terminal of claim 13, wherein the repository of cell-to-GPS timing data is representative of a timing offset between a first GPS time and a time indicator portion of a communication signal from a first cell, and is representative of a timing offset between a second GPS time and a time indicator portion of a communication signal from a second cell.

15. The mobile terminal of claim 13, wherein the GPS receiver is configured to acquire GPS signals using the estimated GPS time.

16. The mobile terminal of claim 13, wherein the memory is a non-volatile memory that retains the repository of cell-to-GPS timing data after power has been removed from the mobile terminal.

17. The mobile terminal of claim 13, wherein the processor is configured to communicate at least a portion of the repository of cell-to-GPS timing data to a base station.

18. A mobile terminal comprising:
a receiver that is configured to receive communication signals from cells in a wireless communication system;
a GPS receiver that is configured to receive GPS signals, and is configured to determine a GPS time reference from the received GPS signals; and
a processor that is configured to estimate a cell time reference from the received communication signals, and is configured to determine a time reference for a base station based on the cell time reference and timing advance data from the base station, and is configured to generate cell-to-GPS timing data that is representative of a time offset between the time reference for the base station and the GPS time reference, and is configured to estimate a GPS time based on a time indicator portion of a received communication signal and the cell-to-GPS timing data.

* * * * *